(12) United States Patent
Viswanath et al.

(10) Patent No.: US 7,644,014 B2
(45) Date of Patent: Jan. 5, 2010

(54) DOCUMENT EXCHANGE FRAMEWORK FOR AUTOMATED EXTENSIBLE MARKUP LANGUAGE DATA IN AN E-PROCUREMENT SYSTEM AND METHOD

(75) Inventors: Sridatta Viswanath, Santa Clara, CA (US); Yafeng Li, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1731 days.

(21) Appl. No.: 09/982,214

(22) Filed: Oct. 17, 2001

(65) Prior Publication Data

US 2003/0074279 A1    Apr. 17, 2003

(51) Int. Cl.
*G06F 17/60* (2006.01)
(52) U.S. Cl. .......................... 705/27; 705/1; 379/93.12
(58) Field of Classification Search .................. 707/523; 705/26, 27, 1; 379/93.12
See application file for complete search history.

(56) References Cited

U.S. PATENT DOCUMENTS

| | | | |
|---|---|---|---|
| 4,951,196 A | 8/1990 | Jackson | |
| 5,361,199 A | 11/1994 | Shoquist et al. | |
| 5,557,780 A | 9/1996 | Edwards et al. | |
| 5,694,551 A | 12/1997 | Doyle et al. | |
| 5,708,828 A | 1/1998 | Coleman | |
| 5,758,327 A | 5/1998 | Gardner et al. | |
| 5,835,726 A * | 11/1998 | Shwed et al. | 709/229 |
| 6,023,683 A | 2/2000 | Johnson et al. | |
| 6,044,362 A | 3/2000 | Neely | |
| 6,064,977 A | 5/2000 | Haverstock et al. | |
| 6,065,120 A | 5/2000 | Laursen et al. | |
| 6,125,391 A | 9/2000 | Meltzer et al. | |
| 6,144,990 A | 11/2000 | Brandt et al. | |
| 6,351,745 B1 | 2/2002 | Itakura et al. | |
| 6,601,071 B1 * | 7/2003 | Bowker et al. | 707/102 |
| 6,609,108 B1 | 8/2003 | Pulliam et al. | |

(Continued)

FOREIGN PATENT DOCUMENTS

JP    409146878 A  *  6/1997

(Continued)

OTHER PUBLICATIONS

White, Ron, How Computers Work, Millennium Ed., Que Corporation, Sep. 22, 1999.*

(Continued)

*Primary Examiner*—Pierre E Elisca
(74) *Attorney, Agent, or Firm*—Robert C. Kowert; Meyertons, Hood, Kivlin, Kowert & Goetzel, P.C.

(57) ABSTRACT

In an electronic procurement system having a portal server, an Extensible Markup Language (XML) content integration and transformation method and system. The XML content integration and transformation system includes logic for retrieving an "Open Buying on the Internet (OBI)" compliant XML file from a database which is then formatted in response to an electronic purchasing request over the Internet. In one embodiment of the present invention, the client aware XML content transformation system receives an OBI XML file and uses this information to automatically search for data objects related to the OBI XML file content from a database on the Internet and translates the content into a format suitable for internal processing by the XML content integration and transformation logic and delivers it to the purchasing requisitioner over the Internet.

24 Claims, 8 Drawing Sheets

U.S. PATENT DOCUMENTS

| | | | |
|---|---|---|---|
| 6,658,483 B1 | 12/2003 | Iwamoto et al. | |
| 6,772,413 B2 | 8/2004 | Kuznetsov | |
| 6,792,431 B2* | 9/2004 | Tamboli et al. | 707/102 |
| 6,829,745 B2* | 12/2004 | Yassin et al. | 715/513 |
| 6,876,977 B1 | 4/2005 | Marks | |
| 6,882,983 B2 | 4/2005 | Furphy et al. | |
| 6,892,185 B1* | 5/2005 | Van Etten et al. | 705/27 |
| 6,910,018 B1 | 6/2005 | Okada et al. | |
| 6,931,420 B1 | 8/2005 | Silvester et al. | |
| 6,947,945 B1* | 9/2005 | Carey et al. | 707/102 |
| 2001/0037254 A1 | 11/2001 | Glikman | |
| 2001/0047311 A1 | 11/2001 | Singh | |
| 2002/0023045 A1 | 2/2002 | Feilbogen et al. | |
| 2002/0035514 A1* | 3/2002 | Whitley et al. | 705/26 |
| 2002/0035606 A1 | 3/2002 | Kenton | |
| 2002/0042779 A1 | 4/2002 | Osaka et al. | |
| 2002/0062240 A1 | 5/2002 | Morinville | |
| 2002/0065693 A1 | 5/2002 | Hattori et al. | |
| 2002/0069157 A1 | 6/2002 | Jordan | |
| 2002/0087419 A1* | 7/2002 | Andersson et al. | 705/26 |
| 2002/0091533 A1 | 7/2002 | Ims et al. | |
| 2002/0107699 A1* | 8/2002 | Rivera et al. | 705/1 |
| 2002/0116205 A1 | 8/2002 | Ankireddipally et al. | |
| 2002/0133569 A1 | 9/2002 | Huang et al. | |
| 2002/0143692 A1* | 10/2002 | Heimermann et al. | 705/37 |
| 2002/0152133 A1* | 10/2002 | King et al. | 705/26 |
| 2002/0156685 A1 | 10/2002 | Ehrlich et al. | |
| 2002/0156687 A1 | 10/2002 | Carr et al. | |
| 2002/0174000 A1* | 11/2002 | Katz et al. | 705/7 |
| 2002/0184070 A1 | 12/2002 | Chen et al. | |
| 2002/0184076 A1 | 12/2002 | Susnjara | |
| 2002/0184123 A1 | 12/2002 | Sijacic et al. | |
| 2002/0184145 A1 | 12/2002 | Sijacic et al. | |
| 2002/0188524 A1 | 12/2002 | Shimizu | |
| 2003/0002526 A1* | 1/2003 | Dias et al. | 370/466 |
| 2003/0014617 A1* | 1/2003 | Tamboli et al. | 713/1 |
| 2003/0061121 A1 | 3/2003 | Ouchi | |
| 2003/0069975 A1* | 4/2003 | Abjanic et al. | 709/227 |
| 2003/0074269 A1 | 4/2003 | Viswanath | |
| 2003/0110114 A1 | 6/2003 | Dmochowski et al. | |
| 2003/0139975 A1 | 7/2003 | Perkowski | |

OTHER PUBLICATIONS

Derfler, Frank J. et. al. How Networks Work, Millennium Ed., Que Corporation, Aug. 23, 2000.*

Gralla, Preston, How the Internet Works, 6th Ed., Que Corporation, Sep. 7, 2001.*

Muller, Nathan J., Desktop Encyclopedia of the Internet, Artech House, Inc., 1998.*

Dobler, Donald W. and Burt, David N., Purchasing and Supply Management, Text & Cases, 6th Ed., The McGraw-Hill Companies, Inc., 1996.*

Bragg, Steven M., Accounting Best Practices, John Wiley and Sons, Inc., 1999.*

Jeetu Patel, et al, "More Options for Electronic Filing," InformationWeek, Manhasset Nov. 29, 1999, Issue 763, 5 pages.

"Netscape Announces Availability of Netscape BuyerXpert 2.0 for Corporate Procurement," Pheonix, AZ, Nov. 17, 1998, 3 pages.

* cited by examiner

DOCUMENT EXCHANGE FRAMEWORK FOR AUTOMATED EXTENSIBLE MARKUP LANGUAGE DATA IN AN E-PROCUREMENT SYSTEM AND METHOD

CROSS REFERENCE TO RELATED APPLICATION

This is related to Viswanath et al., co-filed U.S. patent application Ser. No. 09/982,210, filed on Oct. 17, 2001, titled "Customizable Two-Step Mapping of Extensible Markup Language Data in an e-Procurement System and Method". To the extent not repeated herein, the contents of this patent application are incorporated herein by reference.

FIELD OF THE INVENTION

The present claimed invention relates generally to the field of electronic procurement systems. More particularly, the present claimed invention relates to client aware Extensible Markup Language (XML) content retrieval and transformation in an electronic purchasing and procurement environment.

BACKGROUND ART

The Internet has become the dominant vehicle for data communications with a vast collection of computing resources, interconnected as a network from sites around the world. And with the growth of Internet usage has come a corresponding growth in the usage of Internet devices, wireless devices and services in a way different from the traditional uses of such devices.

The growing base of Internet users has become accustomed to readily accessing Internet-based services, which traditionally were restricted or limited to the "client/server" environment, at any time from any location. Accessibility to traditional business services and products over the Internet means enterprises have to adjust to new paradigms of transacting business.

Consequently, some organizations are, for example, implementing e-commerce and customer relationship management (CRM) strategies to increase revenue and bring them closer to their customer base. But organizations that are committed to an e-business strategy realize that their procurement operations are an equally critical aspect of their business. By implementing a sound e-procurement solution, organizations can truly integrate with their supply chain partners and realize dramatic business efficiencies and cost saving in purchasing everything from office supplies to services to raw materials.

For any organization, procuring goods and services is a core business function that is critical to successful operations of the company. All organizations must procure "indirect" goods such as office supplies and other materials that support business operations and enable maintenance and repair operations (MROs) to function.

In addition, many organizations must also procure "direct" goods, such as raw materials or components that are used in manufacturing processes. Other goods or services that organizations must procure include travel, consulting services and equipment.

Many large organizations have dedicated resources that handle procurement at a corporate level. By centralizing procurement, organizations can bring control over the entire process and improve their purchasing efficiencies. Unfortunately, in many organizations, procurement is still a fragmented, paper-intensive process that involves many forms, phone calls, and approval cycles. Just as procurement requires interfacing with multiple suppliers, it requires interacting with different areas of the organization (accounting, management, lines of business, receiving, etc.) each of which may have different processes and approval flows.

As organizations begin to embrace e-business technologies for selling goods and serving their customers online, they are also beginning to look at the efficiencies that e-commerce technologies can bring their internal procurement operations. Thus, e-procurement is quickly assuming a highly strategic role within the e-business strategies of many organizations.

With e-procurement, organizations can move the entire purchasing catalogs into a central catalog of products from approved suppliers, helping buyers quickly locate goods and services. E-procurement helps automate the formerly time consuming review process typically required to approve requisitions and initiate purchases. Finally e-procurement helps the organization realize efficiencies by accelerating the purchasing process, identifying existing inventory to minimize redundant purchasing, detecting unauthorized spending, determining purchasing patterns for improved budgeting, and ensuring contract compliance.

As the number of business applications on the Internet increases, having restricted content and very limited information about goods and services transactions over the Internet impairs the ability of purchasing professionals to take advantage of Internet technologies and provide efficient and cost effective services.

SUMMARY OF INVENTION

Accordingly, to take advantage of the myriad of e-commerce applications being developed, an e-purchasing and e-procurement system are needed that have extensibility capabilities to allow content requests from purchasing requisitioners to the e-purchasing and e-procurement system to be formatted based on available Internet purchasing standards. Further, a need exists for a system and method of presentation formatting of content to be different from the formatting logic of the user's request to enable ready implementation of data gathered for presentation to the client. A need exists for "out-of-the-box" solutions to allow technically unsophisticated end-users to connect to the Internet and perform sophisticated purchasing and procurement decisions and activities not available in the prior art in an organization's purchasing environment without unduly tasking the end-user's technical abilities. A need further exists for an improved and less costly device independent system, which improves efficiency and provides content to various users of different configurations without losing the embedded features designed for these devices.

What is described is an e-procurement system having a portal server supporting a robust procurement system providing a wide range of features that purchasing and procurement applications require including storing capabilities for various purchasing and procurement functions in a business environment. In one embodiment of the present invention, the procurement system includes a catalog management system that integrates information from multiple external catalogs into a consolidated catalog of goods and services from approved suppliers to enable a purchasing or procurement agent to purchase items over the Internet.

In one embodiment of the present invention, the procurement processing system includes a requisition and order management module that helps organizations streamline the requisitions process in the organization. The requisition and order management module allows users to request multiple items from different suppliers or a single requisition from a plurality of back-end resource servers on the Internet and transforms the content into a format suitable for delivery to the purchasing requisitioner. In one embodiment, an Extensible Markup Language (XML) content is formatted to transform the XML content from an external source into an appropriate markup content for delivery to a request from a user of the e-procurement system of the present invention.

The present invention further includes a Document Exchange Framework that allows multiple documents to be delivered at multiple locations based on a single requisition request by a user. The Document Exchange Framework allows the e-procurement system of the present invention to automatically process inbound and outbound XML document requests handled by the e-procurement system.

Embodiments of the present invention are directed to a system and a method for accepting in-bound order requests in a first data format from users and transmitting out-bound orders in a second data format substantially different from the first data format. The document framework of the present invention is further utilized to accept communications from the formatting and presentation logic in the electronic purchasing and procurement environment of a business enterprise. In general, embodiments of the present invention vary the degree of handling supplier or buyer requests in a plurality of purchase orders or requisitions from a plurality of web-based order catalogs in the electronic procurement environment. Embodiments of the present invention implement an internal proprietary content request formatting to retrieve extensible markup language content from a data-source external to the e-procurement system or from a file-system on a server based on detailed user request information. In other words, the embodiments of the invention provide user specific content request formatting and presentation of content gathered from various back-end resources and presented in a consolidated form in the e-procurement environment.

Embodiments of the invention include an extensible markup language (XML) content generation and transformation solution. It is designed to improve the handling of "Open Buying on the Internet (OBI) Standard" content requests from a variety of user requisition requests to the procurement and purchasing system of the present invention. The requested information may be gathered from a variety of supplier catalogs over a variety of web-sites and integrated for presentation to a variety of different user requests. The present invention allows for the intelligent formatting of Internet based OBI standard language content requests to the purchasing and procurement system using one or more Internet access protocols available to the user. The data gathered is formatted into a coherent and cohesive content into one or more markup language documents suitable for delivery to the requesting user.

To achieve the content request delivery formatting and data presentation formatting of the present invention, embodiments provide a software-implemented process based on the Document Exchange (XDOC) format for use in an Internet purchasing based environment using a variety of markup languages to format data content to any number of documents without modifying the underlying document exchange framework code. In one embodiment of the present invention, a Extensible Markup Language (XML) may be used to format content requests from the user to the purchasing and procurement system. The purchasing and procurement system then uses a sub-processing XDOC framework to generate XML data fetched and parsed in response to the user's request.

Embodiments of the present invention receive a user purchase requisition request from a particular user using an Internet based Open Buyer's Interface standard protocol. OBI is the standard used to connect multiple e-commerce sites together to provide real time data sharing between suppliers and purchasers. OBI allows multiple Internet sites to behave as one site.

Embodiments of the present invention generate out-bound documents in response to the in-bound requests from purchasers over the Internet. Out-bound documents are generated in XML which allows batched process data from on site to another. XML allows systems to be updated as data is passed back and forth from one system to another. The present invention allows the XML data to be configured to export and import data to the appropriate system on-demand, share real-time data between multiple sites and effectively keeps site data in synchronization.

A sub-process is used for formatting the requested data for presentation to the requesting purchasing requisitioner. In this embodiment, the present invention associates the contents of a purchase order to an arbitrary XML data source in a database associated with the e-procurement system. The retrieved XML data is transformed using a proprietary data object and attributes transformation logic into an appropriate format such as a Hyper-Text Markup Language and a host of other markups languages.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrates embodiments of the invention and, together with the description, serve to explain the principles of the invention.

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments.

On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

The invention is directed to a system, an architecture, sub-system and method to manage a extensible markup language content request formatting and presentation processes in a e-commerce procurement and purchasing environment in a way superior to the prior art. In accordance with an aspect of the invention, a e-procurement and e-purchasing system provides users content request formatting processes and presentation formatting processes that enables order requisition to be electronically processed on-line on the Internet.

In the following detailed description of the present invention, a system and method for Internet protocol based communication system are described. Numerous specific details are not set forth in order to provide a thorough understanding of the present invention. However, it will be recognized by one skilled in the art that the present invention may be practiced without these specific details or with equivalents thereof.

Generally, an aspect of the invention encompasses providing an integrated e-procurement and e-purchasing system which provides a wide range of order requisition, process, acknowledgement and other services to online users who may connect to an enterprise on-line purchasing and requisition system.

Figure 1:
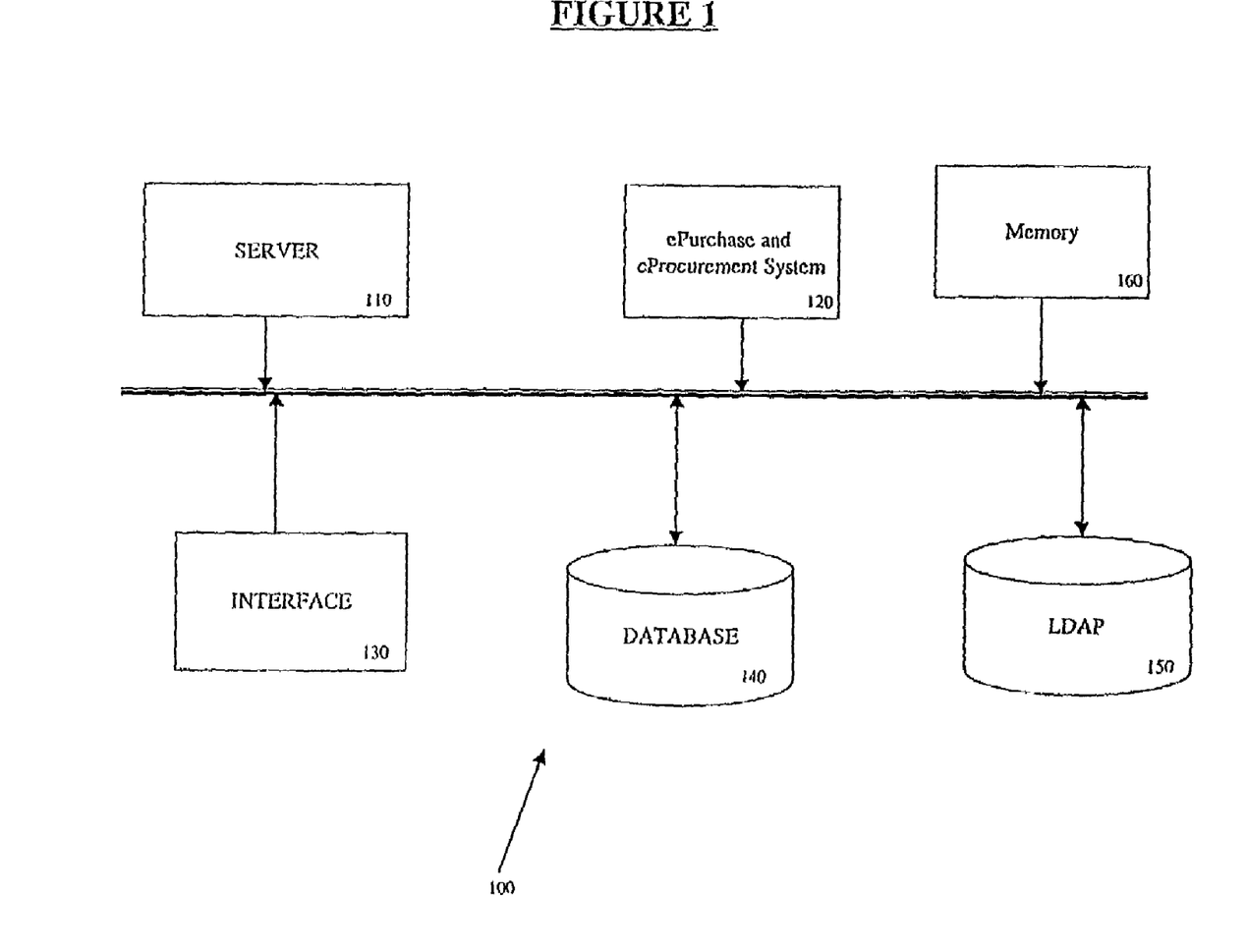
FIG. 1 is a block diagram of one embodiment of the e-commerce environment of the present invention.

FIG. 1 depicts an e-commerce procurement and purchasing environment of one embodiment of the present invention. The on-line purchasing and procurement environment 100 shown in FIG. 1 comprises computer server 110, e-Purchase and e-Procurement system 120, Interface 130, Database 140, Directory 150 and Memory 160 coupled a common communication channel.

Server 110 is coupled to provide a e-platform application server for the e-procurement and e-purchasing environment of the present invention. Server 110 provides a user a single sign-on facility to the e-Procurement system 120 of the present invention, as well as the ability to customize the e-Procurement system 120. Server 110 also provides scalability and high availability to the user.

The e-Procurement system 120 is coupled to Server 110 to provide an online centralized control for buying goods and services for enterprise operations. The e-Procurement system 120 further provides a business-to-business application for purchasing and procurement professionals within an organization in the enterprise. The e-Procurement system 120 is extensible to allow non-professional purchasing and procurement persons with the enterprise to purchase consumables such as office supplies, small office equipment and services from suppliers on the Internet.

Still referring to FIG. 1, Interface 130 couples to e-Procurement system 120 to provide a foundation for order submissions, and the communication between a customer and legacy systems and the e-procurement system 120 of the present invention.

Interface 130 further supports secure transmission of data over public and private networks, as well as the storage of documents, tracking of services and the management of tasks. In one embodiment of the present invention, Interface 130 supports the American National Standards Institute (ANSI) ASCII 12 and other communication interface standards. Interface 130 further supports the use of graphical tools for mapping, translation and conversion of any file format such as Electronic Data Interface (EDI) to a different file format.

Database 140 is coupled to the e-Procurement system 120 to provide ordering and catalog information to the user. Database 140 may be an "off-the-shelf" software product such as an Oracle database software developed and sold by Oracle corporation of Redwood City, Calif. In the present invention, data is stored in database 140 in the form of data objects with associating data attributes.

In the e-Procurement system of the present invention, Database 140 provides an intermediary storage facility of catalog information where orders originated by a user are stored. In-bound orders are processed by e-Procurement system 120 using order information retrieved from the catalogs stored in database 140. The e-Procurement system 120 transmits out-bound order documents based on available catalog information from a supplier to the buyer.

Directory 150 ("LDAP") is coupled to the e-Procurement system 120 to store membership information of users of the e-Procurement system 120. Directory 150 also stores information on the suppliers, as well as location information of buyers and seller in order to facilitate an effective and efficient communication of order and supply information between enterprises.

Memory 160 is coupled to the server 110 to store transient copies of purchase requisitions stored in database 140. A purchase order requisition of catalog information stored in memory 160 has a one-to-one correlation with data objects stored in database 140. Information stored in memory 160 are stored as data objects or the like in a manner well known in the art.

Figure 2:
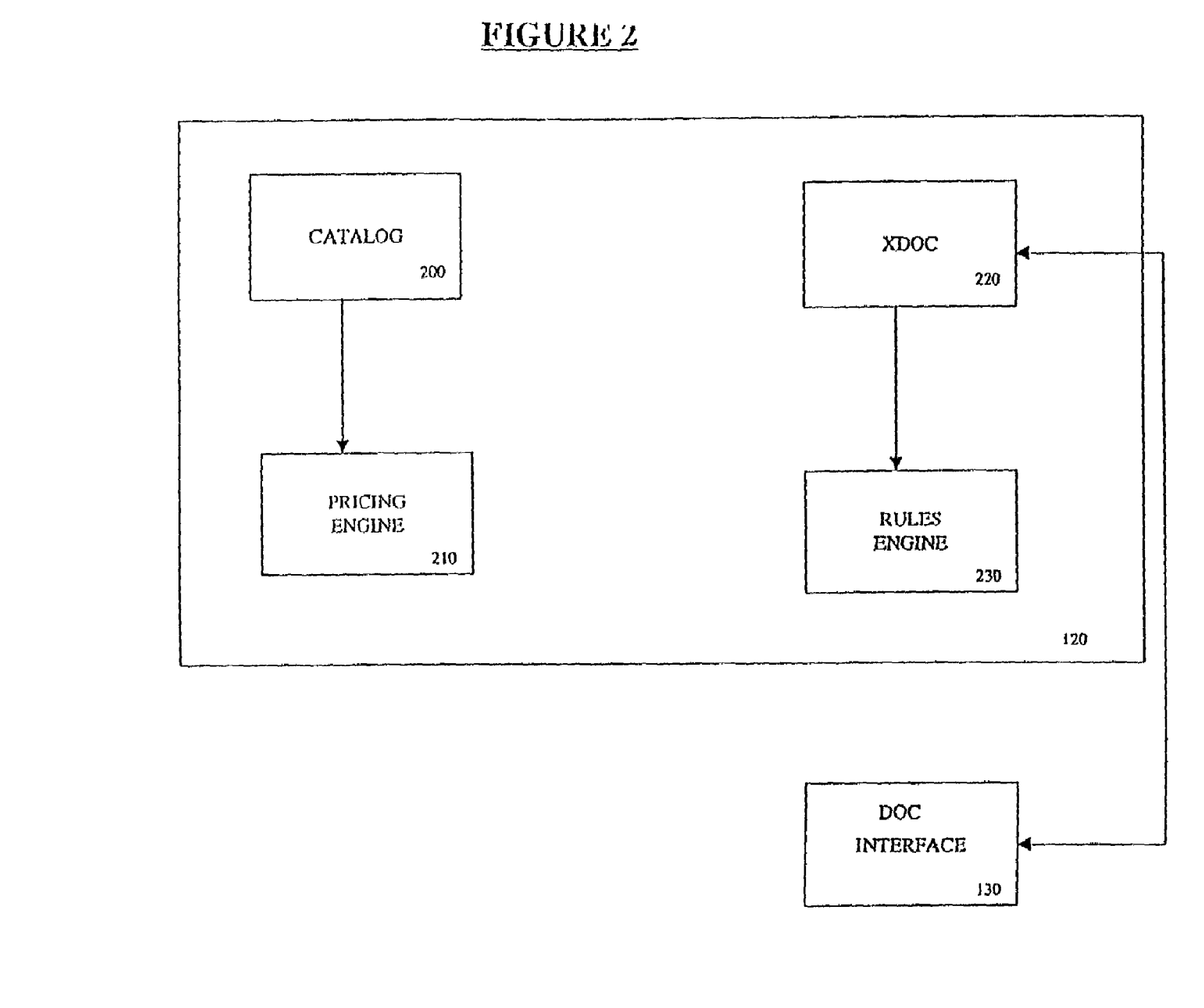
FIG. 2 is a block diagram of an embodiment of the architecture of the e-procuring and e-purchasing system of one embodiment of the present invention.

Referring now to FIG. 2, a block diagram of one embodiment of the e-Procurement system 120 of the present invention is shown. As shown in FIG. 2, e-Procurement system 120 comprises Catalog managing module 200, Catalog pricing module 210, Document Exchange (XDOC) module 220 and rule engine module 230. Also shown in FIG. 2 is DOC Interface module 130 which is coupled to XDOC 220.

To make products available to buyers, supplier organize product information into catalogs. The product information structure in a catalog is a hierarchy of categories with items under these categories. The ways of representing this information vary from supplier to supplier, even among suppliers of similar products.

Catalog management module 200 allows suppliers to map their existing catalogs to the e-Procurement system 120 using a set of graphical interface tools. Catalog management module 200 allows for a quick real-time catalog creation and maintenance by providing the creation of buyer managed content.

Catalog management module 200 further enables a system administrator of the e-Procurement system 120 to create and maintain a standardized structure that maps supplier catalog data to an e-procurement and purchasing environment. Catalog management module 200 also provides the system administrator the environment to create and manage catalogs of group-specific buyers and suppliers and generate requisitions and purchase products.

Pricing module 210 is coupled to Catalog management module 200 to provide pricing rules for catalog items provided by various suppliers. Pricing module 210 is configurable to allow the control of the flow of pricing information for purchase requests between a purchaser and a supplier in the e-purchasing and e-procurement environment of the present invention.

XDOC 220 is coupled to Catalog management module 200 to provide a framework for automatically processing in-bound order requests to the e-Procurement system 120 and the corresponding out-bound order data. The e-Procurement system 120 generates XML documents for completing in-bound and out-bound transactions to suppliers, etc. XDOC 220 examines the tags of any incoming document to the e-Procurement system 120 and determines whether a corresponding object to the tag is stored in Database 140. If the incoming document tag has a corresponding database data object, XDOC 220 populates the incoming requests with the attributes that correspond to the identified object tag. For example, an incoming document may have a tag in the incoming XML file such as <billing address>.

This tag is defined by the present invention as a data object as <bill to> in Database 140. Upon identifying the <billing address> tag, XDOC 220 immediately associates the tag with the <bill to> data object in Database 140 and subsequently populates the attributes associated with the <bill to > object. In the present invention, XDOC 220 has the flexibility to write out XML files in different formats. The files can be in "Opening Buying on the Internet (OBI) Standards" compliant format or non-OBI formats depending on how the business rules are set up.

Still referring to FIG. 2, Rules module 230 is coupled to XDOC 220 to provide the underlying business rules that control the operating transaction principles of the e-Procurement system 120. In the present invention, Rules module 230 is configurable with generalized statements that allow system administrators to control the flow and behavior of e-procurement and purchasing system 120. The underlying business rules semantics are not as complex as a full programming language and therefore allow the user to perform typical customizations such as page layouts, icon layouts and other "click and surf" functions typical in Internet computing without requiring any programming experience.

Figure 3:
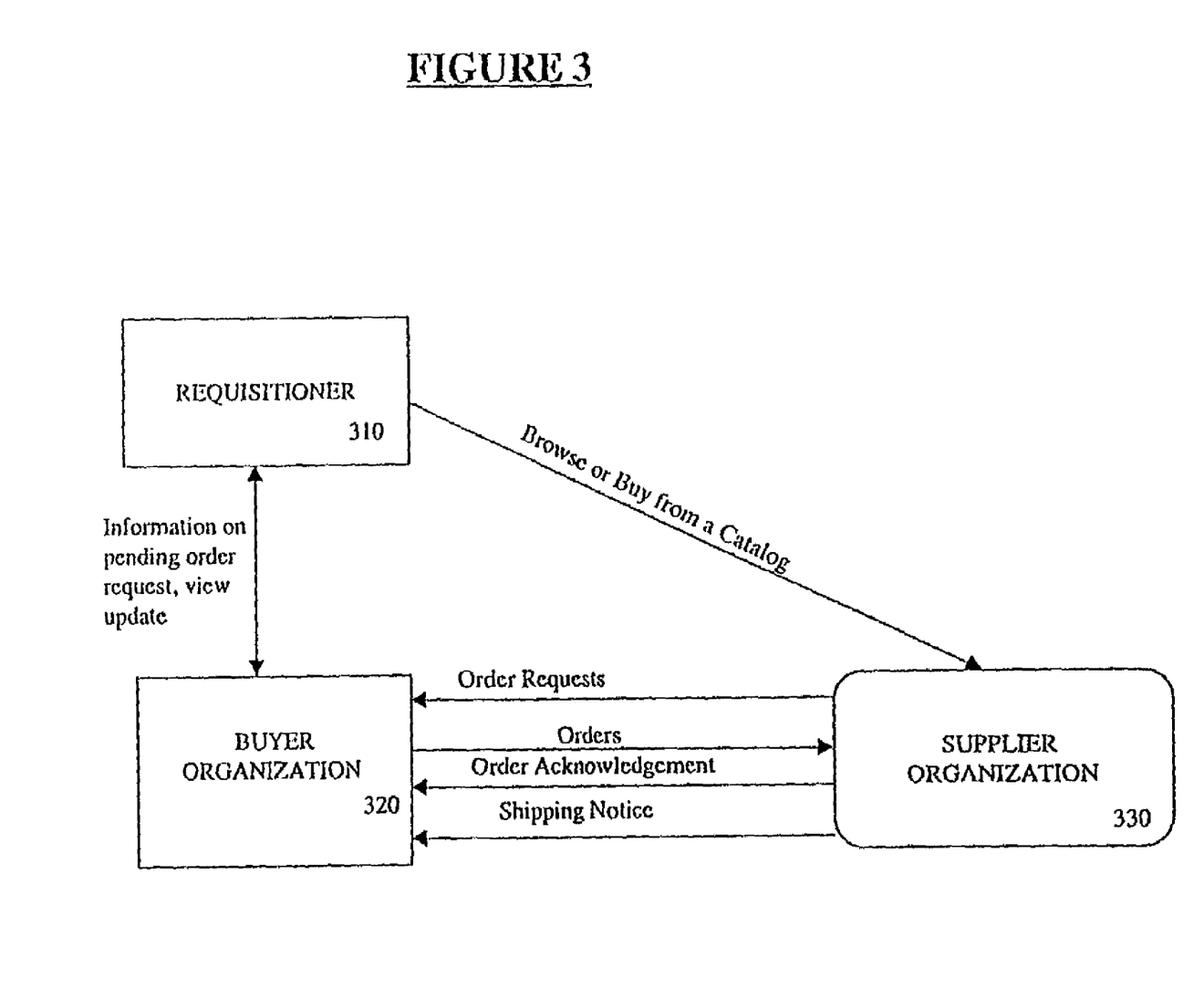
FIG. 3 is a block diagram of an exemplary process flow implementation of a purchase requisition of an embodiment of the present invention.

FIG. 3 is a block diagram depiction of an exemplary process flow of the Open Buying on the Internet (OBI) standard which is the underlying standard utilized in Interface 230. The process flow shown in FIG. 3 illustrates the interaction of these entities: requisition 310, Buying 320 and Supplier 330.

Requisition 310 is the user with a need for a product or service, who meets this need by querying the Supplier 330 catalogs for the required items. The Requisition 310 generates order requests and querying order status to the e-Procurement system 120 using an Internet browser.

Buyer 320 represents a purchasing management and information system which supports purchasing and procurement within an enterprise. These systems include an OBI server for receiving OBI order requests and retrieving OBI orders. The system further includes handling a requisition profile information, trade partner information and other information necessary to complete an order. The Buyer 320 also negotiates and maintains a contractual relationship with the Supplier 330.

Supplier 330 maintains a dynamic electronic catalog that represents accurate product and price information that can be tailored based on the organization's affiliation of the requisitioner 310. Product and price information reflects the contract with a buyer. The supplier's catalog must be integrated effectively with the inventory and order management system and an OBI server for sending OBI order requests and receiving OBI orders.

Figure 4:
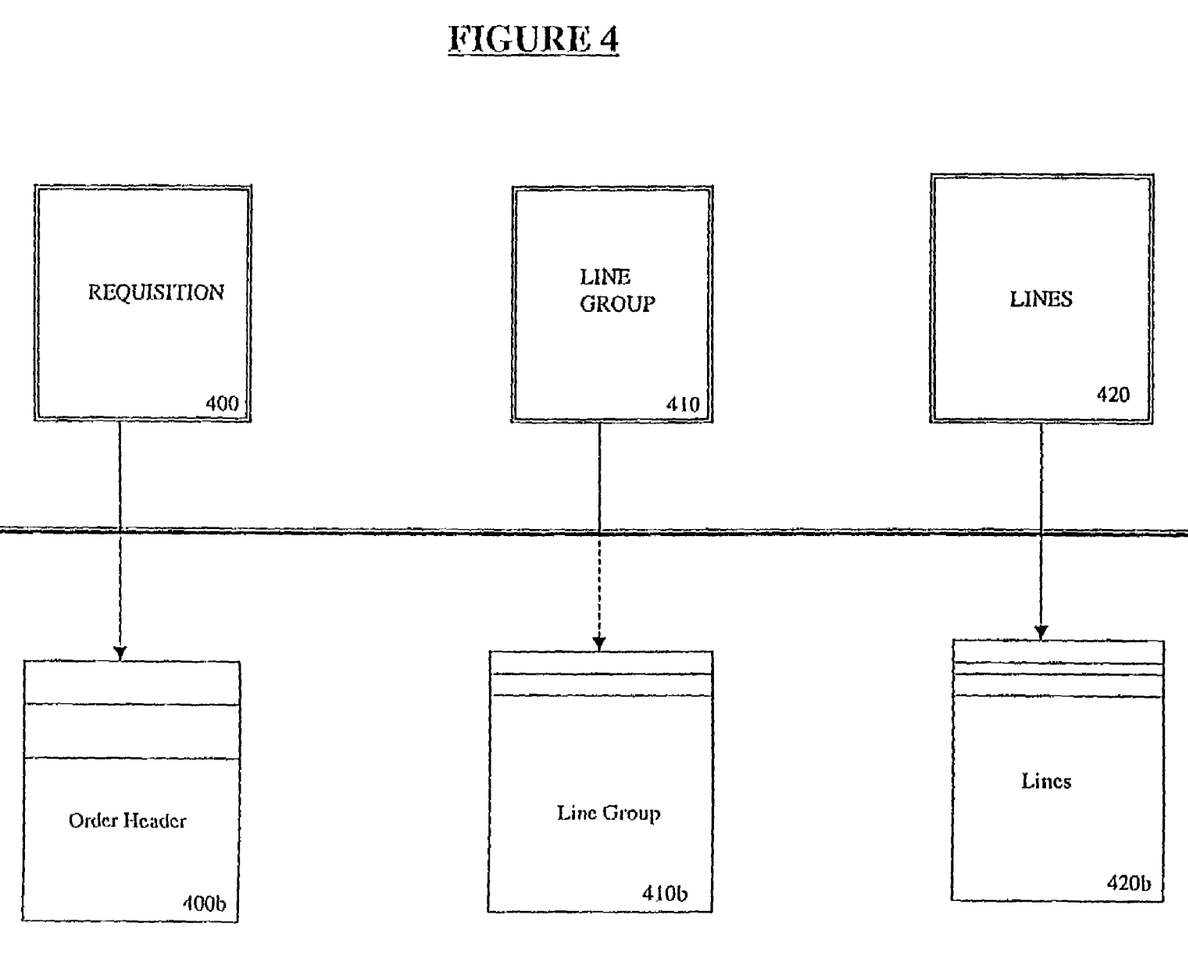
FIG. 4 is a block diagram of an exemplary data layout in memory and in a database of files in an embodiment of the present invention.

FIG. 4 is a block diagram illustration of an exemplary data structure layout of files and data objects of one embodiment of the e-Procurement system 120 of the present invention. As shown in FIG. 4, the file structure of the e-Procurement system 120 comprise requisition 400, line groups 410 and lines 420 which represent files structure stored in Memory 160.

The e-Procurement file system structure further comprise requisition 400*b*, line group 410*b* and line 420*b* which represent data objects which are stored in Database 140 and map to files in the file structure stored in Memory 160. In the present invention, line objects describe line item entries, such as the description of an item being purchased the quantity, the location of the buyer or the supplier, etc., in a purchase order that specify the order by a buyer or response to an order from a supplier respectively. And each line object has attributes which define for example the purchase number, the expiration date of the order, the creation date of the order, the modification date of the order, etc.

Requisition 400 and the corresponding data objects requisition 400*b* represent an electronic list of items a buyer has. A requisition is a purchase request that has not yet been approved as a purchase order. In the present invention, Requisitions 400 and 400*b* include templates that can be used to create another requisition. The template can contain actual items that are repeatedly ordered or other types of information such as default billing, shipping and approval information.

Line group 410 and the corresponding data objects 410*b* represent groups of line items that have an association and are contained in a number purchase requisitions which indicate the type of items that a buyer orders or a supplier has available for sale. Line groups form a number of requisitions may include, for example, Invoice line numbers, Order codes, Order line item number, etc.

Lines 420 and the corresponding data objects lines 420*b* represent the line items contain in each purchase requisition. As shown in FIG. 4, each line in memory maps to a data object line in Database 130. Also, each line in either Memory 160 or Database 140 maps to a line in Line group 410 and 410*b* respectively. In the present invention, line groups and lines are data items which are stored in Database 140 as data objects and data attributes.

Although the data objects and attributes may differ, the document transformation logic of the present invention relates the data object and attributes in a manner that enables the XDOC 220 to retrieve data in a relational manner when exact information of a purchase requisition is not found in the Database 140. The function and method of the file layout in Database 140 and Memory 160 is described in U.S. patent application titled "Dynamic Criteria Based Line-Grouping Mechanism and Method for Purchase Order Generation", filed on Oct. 15, 2001, Ser. No. 09/981,147, assigned to the assignee of the present invention and hereby incorporated by reference herein.

Figure 5:
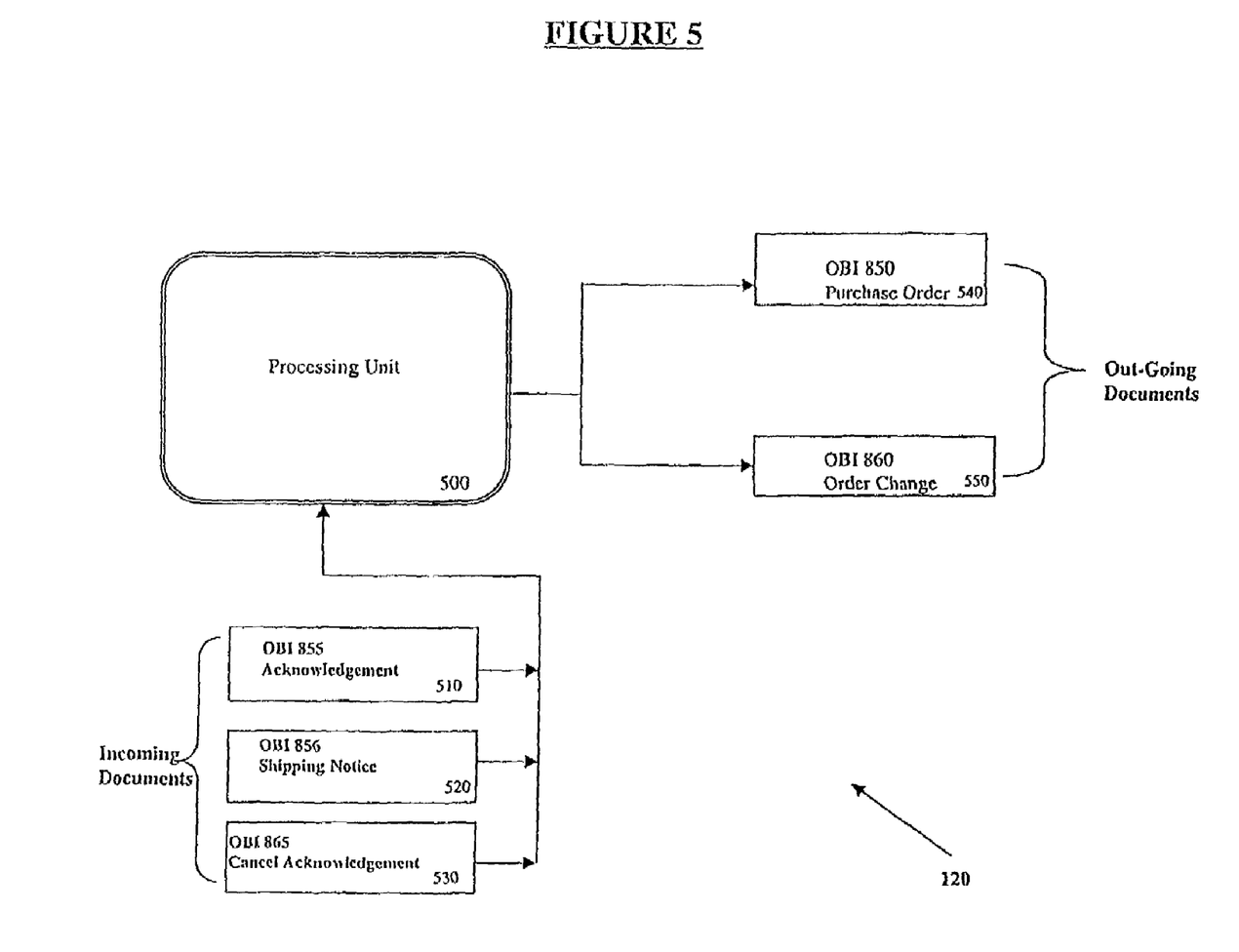
FIG. 5 is a block diagram of an exemplary in-bound and out-bound document generation of one embodiment of the purchasing and procurement system of the present invention.

FIG. 5 is block diagram depiction of one embodiment of the XDOC framework 220 of the present invention. As shown in FIG. 5, the Framework 220 comprises Processing Unit 500, in-bound documents 510-530 and out-bound documents 540-560.

Processing Unit 500 comprises XML processing logic for automatically processing order requests and responses in XML or other applicable markup languages for purchase requisitions made via the e-Procurement system 120 of the present invention.

Process unit 500 generates XML documents for sending out order requests to suppliers by buyers or procurement professionals. Processing unit 500 also handles in-bound request documents (e.g., 510-530) originating from suppliers responding to order requests from buyers using the e-Procurement system 120 of the present invention. The Processing Unit 500 uses a documents exchange logic to automate the processing of in-bound request documents which are typically OBI compliant XML files. The Processing Unit 500 further generates out-bound documents by relating file information contained in the in-bound and out-bound documents to data objects and attributes retrieved from database 140 based on the prior knowledge of the user's purchasing characteristics.

Still referring to FIG. 5, the in-bound documents comprise documents 510-530 which typically represent an "OBI 855" document (in one embodiment) for handling order acknowledgements from a supplier, "OBI 856" documents which typically handle advance shipping instructions from the supplier to the buyer indicating when goods ordered by the buyer may be delivered. The in-bound documents further include "OBI 865" documents (in one embodiment) which typically represent order cancellation acknowledgements from the supplier to the buyer acknowledging receipt of an order cancellation by the buyer.

Out-bound documents comprise documents 540 which typically represent OBI XML documents which may include a XML translation of the entire in-bound document set present to the Processing unit 500. Document 550 is included in out-bound documents to typically represent "OBI 850" documents which represent Purchase Order generation to the supplier. Purchase Orders represent requisitions that have been approved by the buyer for supply by the supplier.

Document 560 represents "OBI 860" documents set which typically include order changes that are submitted by the buyer to the supplier after a purchase order has been provided to the Supplier.

Figure 6:
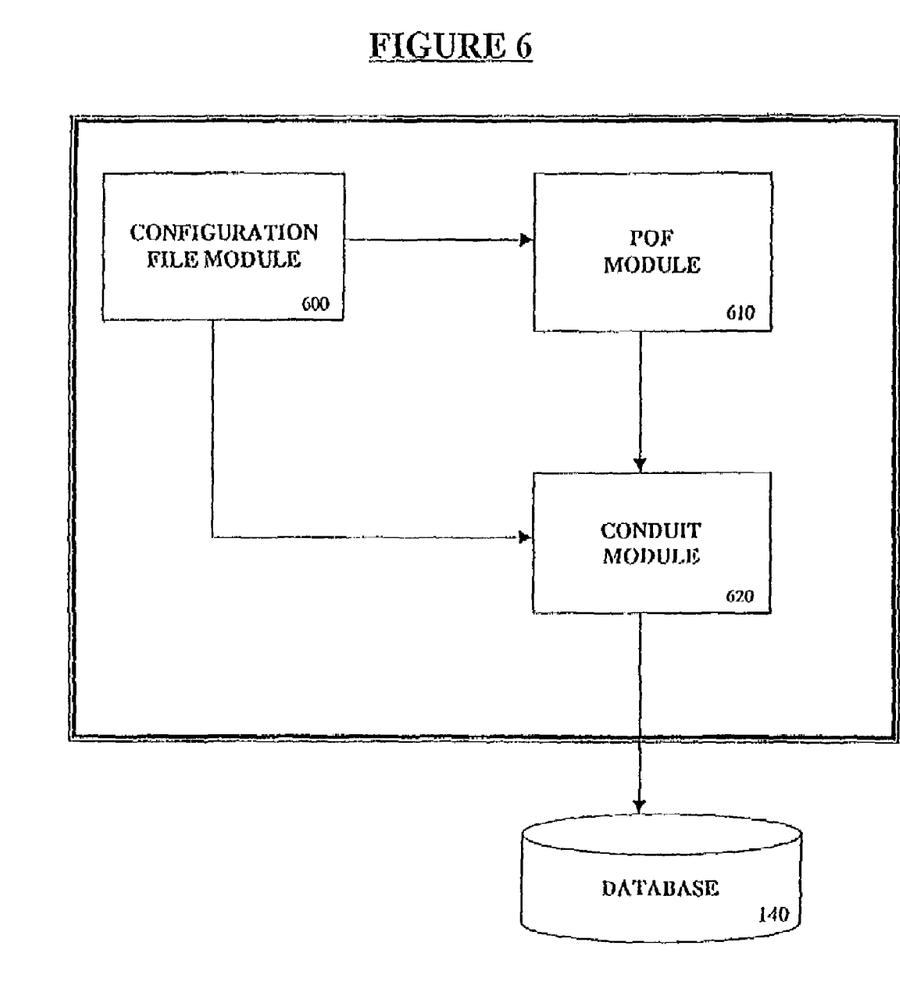
FIG. 6 is a block diagram of an embodiment of the functional units of the XDOC unit of one embodiment of the present invention.

FIG. 6 is a block diagram depiction of one embodiment of the internal architecture of the XDOC framework 220 of the present invention. As shown in FIG. 6, XDOC framework 220 comprises Configuration File module 600, Persistent Object Frammer (POF) 610, and Conduit module 620.

Configuration File module 600 is coupled to provide data automation processing of in-bound and out-bound data requests to the e-Procurement system 120 of the present invention. The Configuration File module 600 is extensible and customizable by a user to provide relational data objects that correspond to tags in the incoming documents that may not exist in database 140 or are not identified by the XDOC framework 220. Configuration File module 600 enables XDOC framework 220 determine what attributes are included in objects in for example, a line group, in a line, etc.

The Configuration File module 600 also provides a mechanism for the e-Procurement system 120 to define the relationship between data objects and attributes in the purchase requisition process of one embodiment of the invention. The Configuration File module 600 defines the tables in database 140 in a tree structure to allow the XDOC 220 to retrieve related objects by recursively traversing the data object file layout in the Database 140.

POF 610 is coupled to the Configuration File module 600 to provide a way of handling data objects in Database 110 and maintain the persistency of these data objects. The data objects are provided to Conduit module 620 which is coupled to the Configuration File module 600 which determines how the data objects may be processed. The Conduit Module 620 also identifies the attributes of the data objects and corresponding attributes that may relate to the particular data object.

Figure 7:
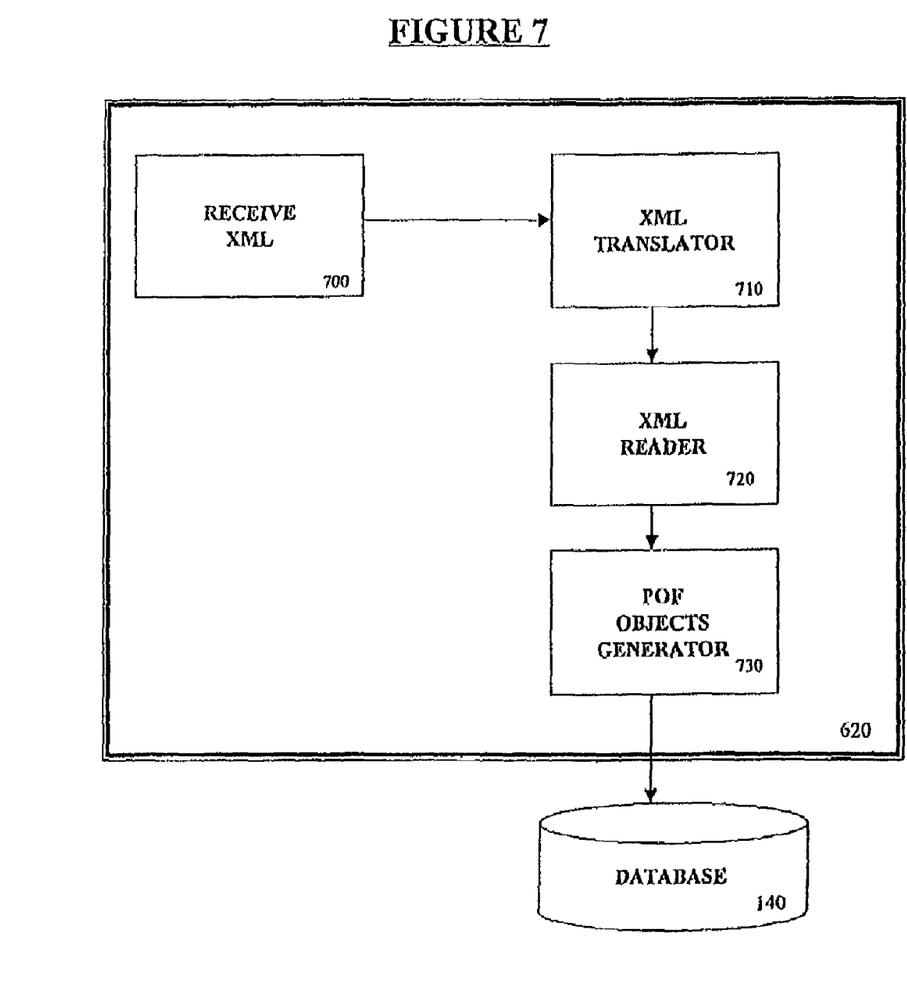
FIG. 7 is a block diagram of an embodiment of the Extensible Markup Language (XML) data transformation unit of one embodiment of the present invention.

FIG. 7 is a block diagram of one embodiment of the Conduit module 620 of the present invention. As shown in FIG. 7, Conduit module 620 comprises GETXML module 700, XML Translator 710, XML Reader 720 and POF Object Generator 730.

GETXML module 700 is coupled to receive external OBI XML files from an external source ( e.g., Buyer or Supplier). The external OBI XML file includes the various tags identifying the various purchase order parameters specified by the buyer or supplier to identify goods or service purchasing transaction processed by the e-Procurement system 120 of the present invention. The parameters may be buyer or supplier specific or generic to every user of the e-Procurement system 120.

The external OBI XML file received by GETXML module 700 is presented to XML Translator 710. XML Translator 710 translates the external OBI XML files into unique and proprietary XML files internal to the Conduit module and the eProcurement system 120 which will be consistent with the data attributes and objects stored in database 140. Mapping the external OBI XML files to the data objects stored in database 140 allows the XDOC framer 220 to handle a variety of files with attributes which may not be identical or similar between buyer groups or supplier groups. XML Translator 710 translates the external OBI XML files to a buyer-XML file format which is then provided to the XML reader 720.

The XML reader 720 passes internal XML files corresponding to the external XML files into the appropriate objects and attributes that are generated by POF Object Generator 730 that may be stored in the Database 140. The objects generated by POF Object Generator 730 are persistent in nature and may reside in Memory 160 without any substantial changes to the data.

The XML reader 720 also traverses the Database 140 to retrieve data attributes and objects corresponding to a purchase order from the Database 140 in response to the XML file presented to the Conduit module 630. If the XML reader 720 identifies a data attribute in Database 140 that matches a requested purchase order object or attribute, that particular attribute is presented to the requesting entity (e.g., buyer or supplier).

On the other hand, if the data attribute mapped from the XML Translator 710 is not located in the Database 140, the XML Reader 720 uses a relationship location logic to locate data objects which may be related. The relationship logic defines which tables, lines, line groups may be related in the Database 140. For example, a line group comprises several lines with each line defining specific items (e.g. ship-to-location, bill-to-location, etc.) in the purchase order.

In an embodiment of the present invention, attributes of a specific data object can be selectively written out during an XDOC processing of a document. A user may also specify the purchase order processing to custom-property for relationships. This allows, for example, the write-out of line objects associated with a line group when the line group is written out. The XDOC process also allows the user to selectively retrieve specific attributes of a line object without retrieving all the objects associated with the particular line.

Figure 8A:
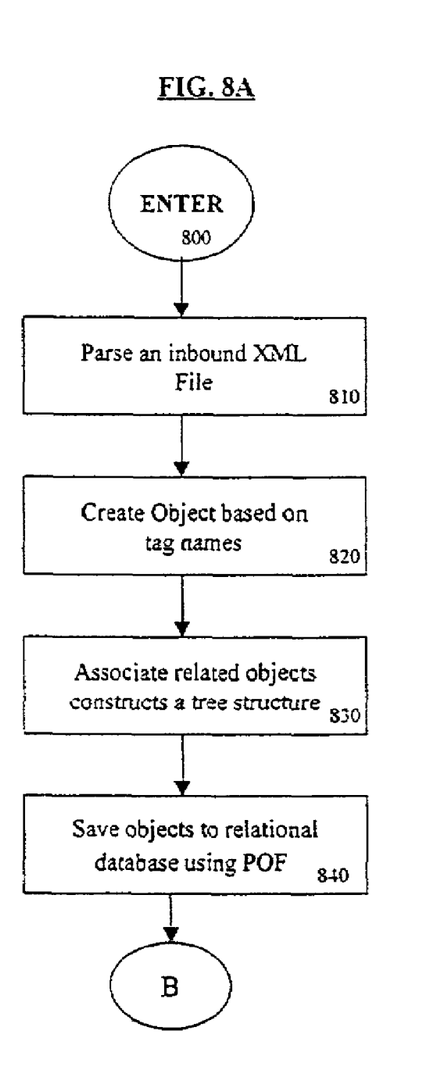
FIG. 8A and FIG. 8B are flow diagrams of one embodiment of the XML data fetching and transformation processes in accordance with one embodiment of the present invention.
Figure 8B:
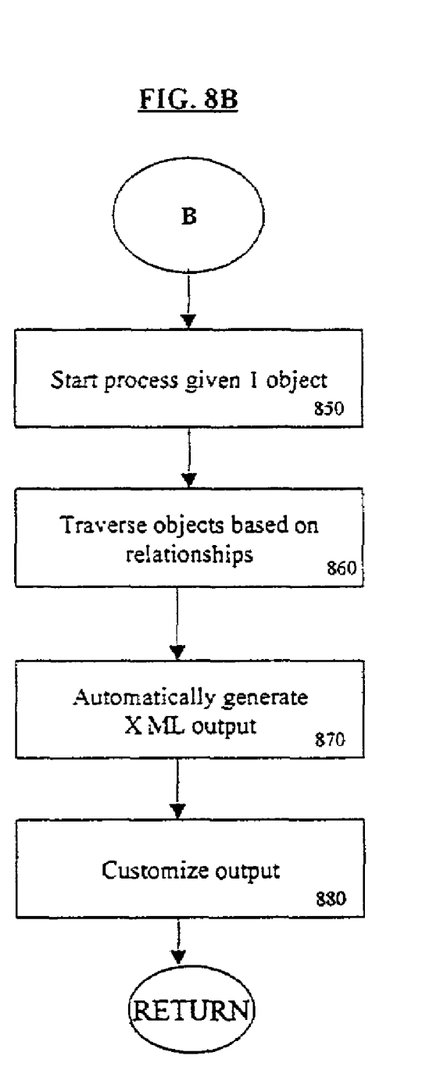

FIG. 8A and FIG. 8B represent a flow diagram depiction of an exemplary process flow in accordance with one embodiment of the processing of inbound and outbound documents respectively of the present invention. The steps performed by the diagrams of FIG. 8A and FIG. 8B are performed by a computer system processor executing memory stored instructions which make up a program or application.

As shown in FIG. 8A, the processing of inbound documents is initiated at step 800 when the XDOC framework module 220 receives inbound purchase orders from a requisition entity. At step 810, the XDOC framework module 220 parses the inbound XML file to identify the contents of the file. At step 820, the XDOC framework module 220 extracts the tag names contained in the XML file and creates data objects based on the tag names.

At step 830, the XDOC framework module 220 generates a data object tree structure by identifying associating related objects to the data object created in step 820. The tree structure generated by the XDOC framework 220 is then saved in a relational database format using the persistent object framework of an embodiment of the present invention in database 140 at step 840.

Outbound document processing commerce at step 850 with the presentation of one data object as the identifying characteristics of a particular purchase order at step 860.

At step 870, the XDOC framework 220 traverses the object tree structure in Database 140 using the relationship between the identified object and other data objects stored in database 140. As the XDOC framework 220 traverses the data object tree structure, like or otherwise related objects are retrieved and automatically transformed into XML files which are then sent to the Configuration file 600 at step 880.

At step 890, the retrieved related object data is customized by the user in the Configuration file 600 which therefore saves the e-Procurement system 120 from recompiling the configuration code again. Processing of the outbound documents generation terminates at step 895 when the XML output file is sent to the requesting entity.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the claims appended hereto and their equivalents.

The invention claimed is:

1. A computer system, comprising:
a processor; and
a memory, wherein the memory comprises program instructions executable on the processor to implement a Document Exchange (XDOC) framework for processing in-bound and out-bound documents in an electronic procurement system, wherein the XDOC framework comprises:
an Extensible Markup Language (XML) content configuration file module that provides XML content gathered from a plurality of in-bound documents and applied to out-bound documents responsive to said in-bound documents;
a conduit file module, coupled to said XML content configuration file module, that receives files in a first XML format and generate corresponding files in a second XML format; and
a persistent object framer (POF) module, coupled to said XML content configuration file module, that maintains data persistence of files stored in a database external to said XDOC framework in said electronic procurement system, wherein said files stored in said database correspond to said XML content in said in-bound documents and said out-bound documents respectively.

2. The computer system of claim 1, wherein said XML content configuration file module further comprises XML content retrieving logic that retrieves XML content from data sources that are external and internal to said XML content configuration file module.

3. The computer system of claim 1, wherein said in-bound documents are purchase orders describing information related to buyer requests in said electronic procurement system, and where said out-bound documents are purchase orders describing supplier goods and services in said electronic procurement system.

4. The computer system of claim 3, wherein said first XML file format is an Open Buying on the Internet (OBI) Standards compliant XML file.

5. The computer system of claim 4, wherein said markup content is substantially compliant with Handheld Device Markup Language content.

6. The computer system of claim 4, wherein said markup content comprises a content suitably adapted to interact with an Internet browser of a computer system.

7. The computer system of claim 6, wherein said XML content configuration file module further comprises availability logic that determines whether content selected by a user in said in-bound documents is available for presentation in said out-bound documents.

8. The computer system of claim 1, wherein said files stored in said database are defined as data objects with related attributes.

9. The computer system of claim 8, wherein said attributes define in granular details, the contents of the data objects stored in said database.

10. A method, comprising:
one or more computers performing:
receiving one or more input documents in a markup language, wherein the input documents comprise a purchasing request, wherein each input document comprises one or more tag names specifying purchasing parameters for the purchasing request;
parsing each of the one or more input document to identify each of the one or more tag names;
generating one or more data objects each corresponding to a respective tag name;
identifying one or more purchasing parameters related to one or more of the identified tag names; and
generating one or more output documents in the markup language specifying a purchasing order to a supplier corresponding to the purchasing request specified in the one or more input documents, wherein the one or more output documents comprise:
one or more tag names corresponding to the one or more identified purchasing parameters, and
one or more data attributes each corresponding to one of the one or more tag names corresponding to the one or more identified purchasing parameters.

11. The method of claim 10, further comprising:
generating a data object tree of the one or more data objects based on relationships between the corresponding tag names as defined in the one or more input documents; and
wherein said identifying one or more purchasing parameters comprises traversing the data object tree comparing each data object of the tree to one or more data objects in a database specifying the one or more purchasing parameters.

12. The method of claim 11, wherein said identifying one or more purchasing parameters further comprises identifying the one or more purchasing parameters based upon a configuration file defining relationships between the purchasing parameters and the one or more tag names.

13. The method of claim 12, wherein the configuration file is one of a plurality of configuration files, wherein each configuration file defines different relationships between the purchasing parameters and the one or more tag names.

14. The method of claim 10, wherein the markup language is eXtensible Markup Language (XML).

15. A device, comprising:
a processor; and
a memory coupled to the processor, wherein the memory comprises program instructions that when executed by the processor execute to:
receive one or more input documents in a markup language, wherein the input documents comprise a purchasing request, wherein each input document comprises one or more tag names specifying purchasing parameters for the purchasing request;
parse each of the one or more input document to identify each of the one or more tag names;
generate one or more data objects each corresponding to a respective tag name;
identify one or more purchasing parameters related to one or more of the identified tag names; and
generate one or more output documents in the markup language specifying a purchasing order to a supplier corresponding to the purchasing request specified in the one or more input documents, wherein the one or more output documents comprise:
one or more tag names corresponding to the one or more identified purchasing parameters, and
one or more data attributes each corresponding to one of the one or more tag names corresponding to the one or more identified purchasing parameters.

16. The device of claim 15, wherein the program instructions, when executed, execute to:
generate a data object tree of the one or more data objects based on relationships between the corresponding tag names as defined in the one or more input documents; and
wherein in said identifying one or more purchasing parameters the program instructions further execute to traverse the data object tree comparing each data object of the tree to one or more data objects in a database specifying the one or more purchasing parameters.

17. The device of claim 16, wherein in said identifying one or more purchasing parameters the program instructions further execute to identify the one or more purchasing parameters based upon a configuration file defining relationships between the purchasing parameters and the one or more tag names.

18. The device of claim 17, wherein the configuration file is one of a plurality of configuration files, wherein each configuration file defines different relationships between purchasing parameters and one or more tag names.

19. The device of claim 10, wherein the markup language is eXtensible Markup Language (XML).

20. A computer accessible medium, comprising program instruction that when executed by a computer implement:
receiving one or more input documents in a markup language, wherein the input documents comprise a purchasing request from a supplier, wherein each input document comprises one or more tag names specifying purchasing parameters for the purchasing request;
parsing each of the one or more input document to identify each of the one or more tag names;
generating one or more data objects each corresponding to a respective tag name;
identifying one or more purchasing parameters related to one or more of the identified tag names; and
generating one or more output documents in the markup language specifying a
purchasing order to the supplier corresponding to the purchasing request specified in the one or more input documents, wherein the one or more output documents comprise:
one or more tag names corresponding to the one or more identified purchasing parameters, and
one or more data attributes each corresponding to one of the one or more tag names corresponding to the one or more identified purchasing parameters.

21. The computer accessible medium of claim 20, wherein the program instructions, when executed, further implement:
generating a data object tree of the one or more data objects based on relationships between the corresponding tag names as defined in the one or more input documents; and
wherein said identifying one or more purchasing parameters comprises traversing the data object tree comparing each data object of the tree to one or more data objects in a database specifying the one or more purchasing parameters.

22. The computer accessible medium of claim 21, wherein in said identifying one or more purchasing parameters the program instructions further implement identifying the one or more purchasing parameters based upon a configuration file defining relationships between the purchasing parameters and the one or more tag names.

23. The computer accessible medium of claim 22, wherein the configuration file is one of a plurality of configuration files, wherein each configuration file defines different relationships between the purchasing parameters and the one or more tag names.

24. The computer accessible medium of claim 20, wherein the markup language is eXtensible Markup Language (XML).

* * * * *

UNITED STATES PATENT AND TRADEMARK OFFICE
CERTIFICATE OF CORRECTION

| | | |
|---|---|---|
| PATENT NO. | : 7,644,014 B2 | Page 1 of 1 |
| APPLICATION NO. | : 09/982214 | |
| DATED | : January 5, 2010 | |
| INVENTOR(S) | : Viswanath et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2401 days.

Signed and Sealed this

Sixteenth Day of November, 2010

David J. Kappos
*Director of the United States Patent and Trademark Office*